(12) United States Patent
Sato

(10) Patent No.: US 6,405,694 B2
(45) Date of Patent: Jun. 18, 2002

(54) VARIABLE VALVE TIMING CONTROL DEVICE FOR INTERNAL COMBUSTION ENGINE

(75) Inventor: Osamu Sato, Takahama (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/876,041

(22) Filed: Jun. 8, 2001

(30) Foreign Application Priority Data

Jun. 9, 2000 (JP) ........................................ 2000-179358

(51) Int. Cl.⁷ ................................................ F01L 13/00
(52) U.S. Cl. ................................ 123/90.15; 123/90.17; 123/90.18; 464/1; 464/2; 464/160
(58) Field of Search ............................ 464/2; 123/90.15, 123/90.17, 90.16, 90.18

(56) References Cited

U.S. PATENT DOCUMENTS

| | | | | | |
|---|---|---|---|---|---|
| 5,129,310 A | * | 7/1992 | Suga et al. | ............... | 123/90.17 |
| 5,823,152 A | * | 10/1998 | Ushida | ............... | 123/90.17 |
| 5,832,887 A | * | 11/1998 | Adchi et al. | ............... | 123/90.17 |
| 5,836,275 A | * | 11/1998 | Sato | ............... | 123/90.17 |
| 5,836,276 A | * | 11/1998 | Iwasaki et al. | ............... | 123/90.17 |
| 5,865,151 A | * | 2/1999 | Fukaya et al. | ............... | 123/90.17 |
| 5,924,395 A | * | 7/1999 | Moriya et al. | ............... | 123/90.15 |
| 5,941,203 A | * | 8/1999 | Sato | ............... | 123/90.17 |
| 5,960,757 A | * | 10/1999 | Ushida | ............... | 123/90.17 |
| 6,006,709 A | * | 12/1999 | Ushida | ............... | 123/90.17 |
| 6,062,183 A | * | 5/2000 | Sato et al. | ............... | 123/90.17 |
| 6,109,225 A | * | 8/2000 | Ogita et al. | ............... | 123/90.15 |
| 6,135,077 A | * | 10/2000 | Moriya et al. | ............... | 123/90.17 |
| 6,155,221 A | * | 12/2000 | Ushida | ............... | 123/90.17 |
| 6,199,524 B1 | * | 3/2001 | Ushida | ............... | 123/90.17 |
| 6,230,675 B1 | * | 5/2001 | Kobayashi et al. | ............... | 123/90.15 |
| 6,250,266 B1 | * | 6/2001 | Okui et al. | ............... | 123/90.17 |
| 6,302,072 B1 | * | 10/2001 | Sekiya et al. | ............... | 123/90.17 |
| 6,308,669 B1 | * | 10/2001 | Lancefield et al. | ............... | 123/90.15 |
| 6,318,313 B1 | * | 11/2001 | Moriya et al. | ............... | 123/90.15 |

FOREIGN PATENT DOCUMENTS

| | | | | | |
|---|---|---|---|---|---|
| JP | | 03199633 A | * | 8/1991 | ............... 123/90.11 |
| JP | | 10-176558 | | 6/1998 | |
| JP | | 10-184404 | | 7/1998 | |

* cited by examiner

Primary Examiner—Thomas Denion
Assistant Examiner—Ching Chang
(74) Attorney, Agent, or Firm—Nixon & Vanderhye P.C.

(57) ABSTRACT

Either of intake and exhaust valves of an internal combustion engine is provided with a variable valve timing device. In a low-speed, low-load range, exhaust valve advanced-closing control is performed to close the exhaust valve at an earlier timing than the top dead center on the intake stroke, thereby trapping residual combustion gases in the cylinder. Furthermore, the cylinder temperature is raised by setting the intake valve opening timing at around the top dead center on the intake stroke or at a later timing thereof to thereby compress by the piston the residual gases in the cylinder during a period from closing the exhaust valve till the top dead center on the intake stroke. Thus it becomes possible to take in the air-fuel mixture into the cylinder at a higher cylinder temperature than the gas temperature of internal EGR caused by conventional valve overlap.

20 Claims, 14 Drawing Sheets

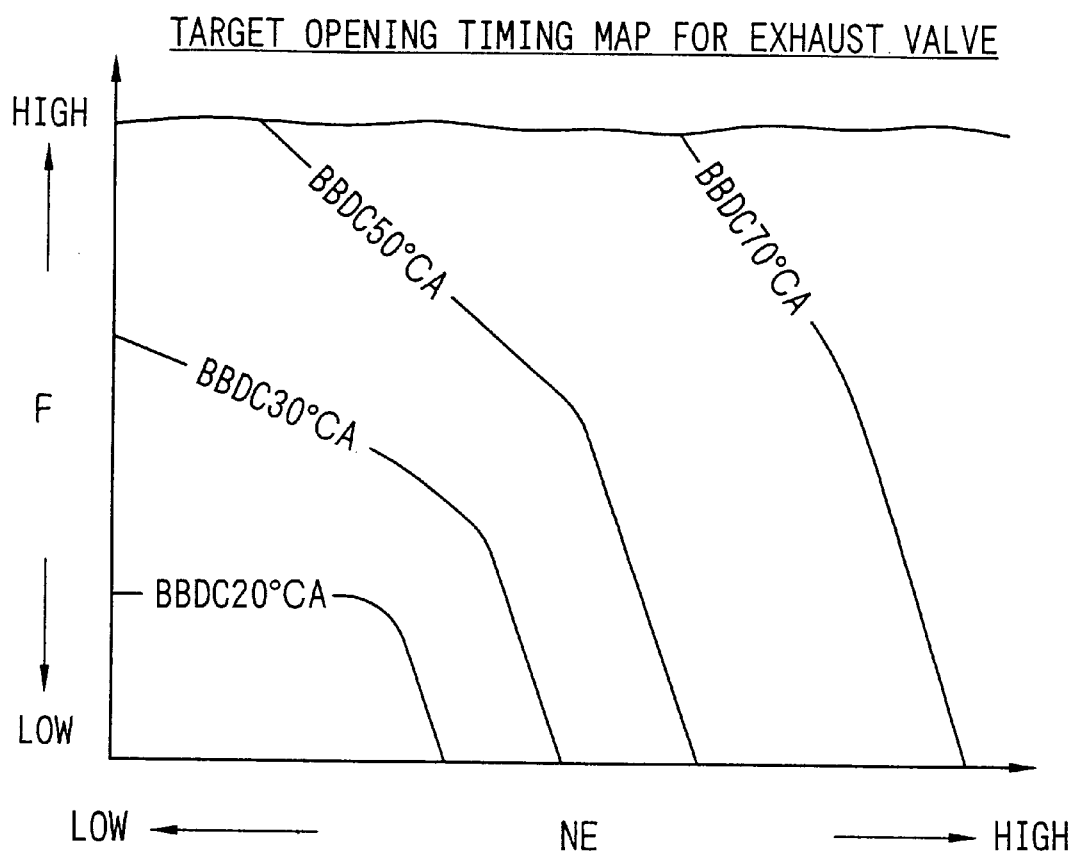

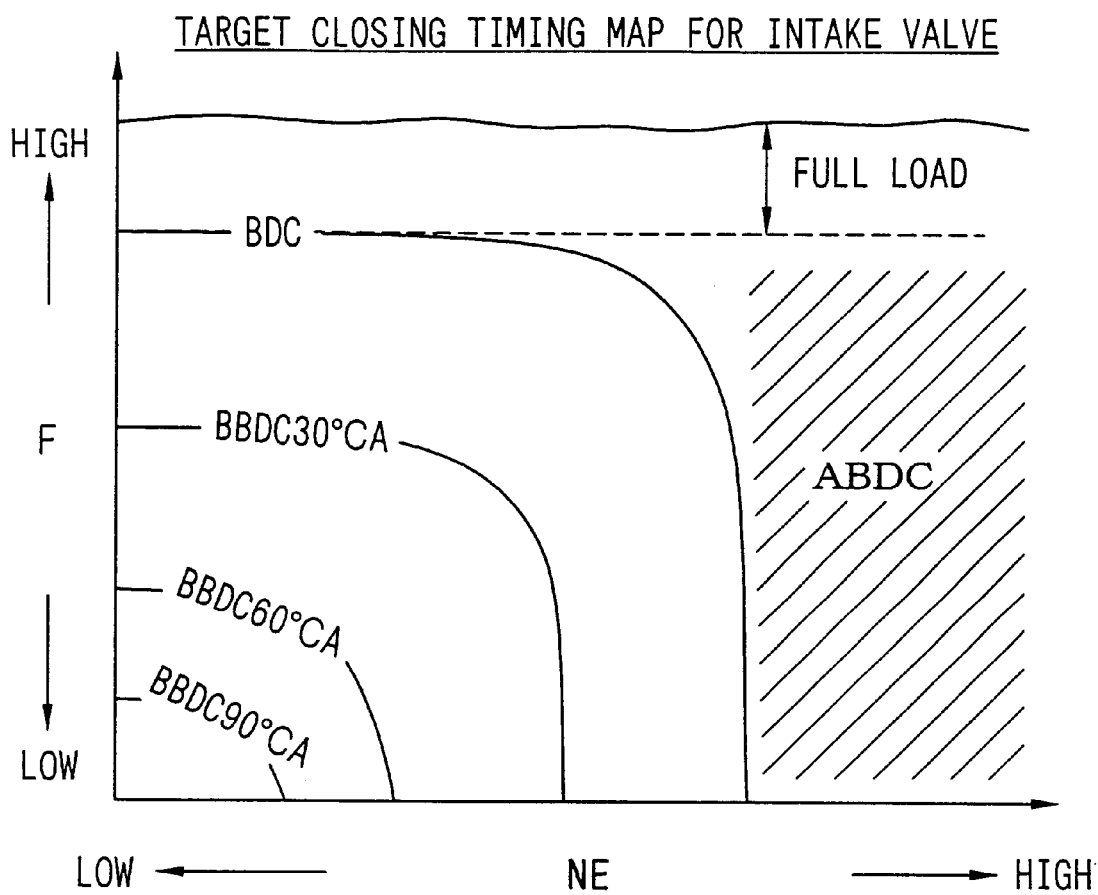

VARIABLE VALVE TIMING CONTROL DEVICE FOR INTERNAL COMBUSTION ENGINE

CROSS REFERENCE TO RELATED APPLICATION

This application is based on and incorporates herein by reference Japanese Patent Application No. 2000-179358 filed on Jun. 9, 2000.

BACKGROUND OF THE INVENTION

1. Field of the Invention

The present invention relates to a variable valve timing control device suitable foe use in an internal combustion engine.

2. Description of Related Art

There has been an increasing tendency that a vehicle-mounted internal combustion engine uses a variable valve timing device for the purpose of improving engine output, improving fuel economy, and reducing exhaust emissions. Most variable valve timing devices in practical use are designed to control the advance amount of the intake valve timing to advance the intake valve timing during part-load operation, thereby increasing the amount of valve overlap to increase the amount of internal EGR gases (amount of residual gases) and accordingly decreasing a pumping loss and improving fuel economy.

However, during low-load operation in which an intake air amount is small, when the amount of valve overlap is increased to increase the amount of internal EGR gases, intake air into engine cylinders is disturbed by blow by of residual gases to the intake side, thereby resulting in lowered fuel combustion and worsening exhaust emission. Furthermore engine vibration increases to worsen drivability. Thus, in a conventional system, it is necessary to reduce the internal EGR gases for combustion stability during low-load operation. In this case, there exists a disadvantage that the operation range within which the fuel economy is improved due to the internal EGR is limited to a medium or greater load, thereby lowering fuel economy improving effect.

SUMMARY OF THE INVENTION

An object of the present invention is to provide a variable valve timing control device for an internal combustion engine which improves fuel consumption ratio by internal EGR without worsening the state of fuel combustion even during low-load operation, and accordingly improve all of the fuel economy, exhaust emissions, and drivability.

In the conventional internal EGR by valve overlap, residual gases in the cylinders (internal EGR gases) during the valve overlap are with the intake air, thereby lowering the cylinder temperature and worsening fuel combustion efficiency.

By taking this point into account, according to a first aspect of the present invention, an exhaust valve advanced-closing control for controlling the valve closing timing of the exhaust valve to the advance side from an intake TDC is executed without using valve overlap by means of a valve timing control means. As in the present invention, when the exhaust valve is closed at an earlier timing than the intake TDC, residual combustion gases in the cylinder is trapped inside of the cylinder, and becomes internal EGR gases. At this time, since the intake valve is held in a closed position for some time after the trapping of the residual gases, it is possible to prevent a temperature drop of the residual gases due to the introduction of the intake air unlike the internal EGR by conventional valve overlap, and also is possible to compress by a piston the residual gases in the cylinder to raise the residual gas temperature during a period from the valve closing timing of the exhaust valve till the intake TDC (or the timing to open the intake valve). Therefore, according to the present invention, even when the internal EGR (the exhaust valve advanced-closing control) is executed during low-load operation, the intake air can be taken into the cylinder with the cylinder temperature held higher than that of the conventional internal EGR, thereby improving fuel atomization in the cylinder to stabilize the state of combustion. Consequently, even when the internal EGR (the exhaust valve advanced-closing control) is executed during low-load operation, it is possible to prevent worsening of emissions due to poor fuel combustion, and furthermore to reduce engine vibration to improve drivability, thereby improving the fuel economy by the stabilization of combustion and the internal EGR.

According to the second aspect of the present invention, a changeover may be made, in accordance with engine load, between the exhaust valve advanced-closing control for controlling the timing to close the exhaust valve to the advance side of the intake TDC and the retarded exhaust valve closing control for controlling the timing to close the exhaust valve to the retard side thereof. For example, at the low-load region, the exhaust valve advanced-closing control is executed to improve fuel economy while stabilizing the state of combustion, and at over the load range, the retarded exhaust valve closing control is carried out to reduce a pumping loss to increase the engine output.

BRIEF DESCRIPTION OF THE DRAWINGS

Additional objects and advantages of the present invention will be more readily apparent from the following detailed description of preferred embodiments thereof when taken together with the accompanying drawings in which:

FIG. 12 is a target exhaust valve opening timing map (second embodiment);

FIG. 14 is a target intake valve closing timing map (third embodiment);

DETAILED DESCRIPTION OF PREFERRED EMBODIMENTS (First Embodiment)

Figure 1:
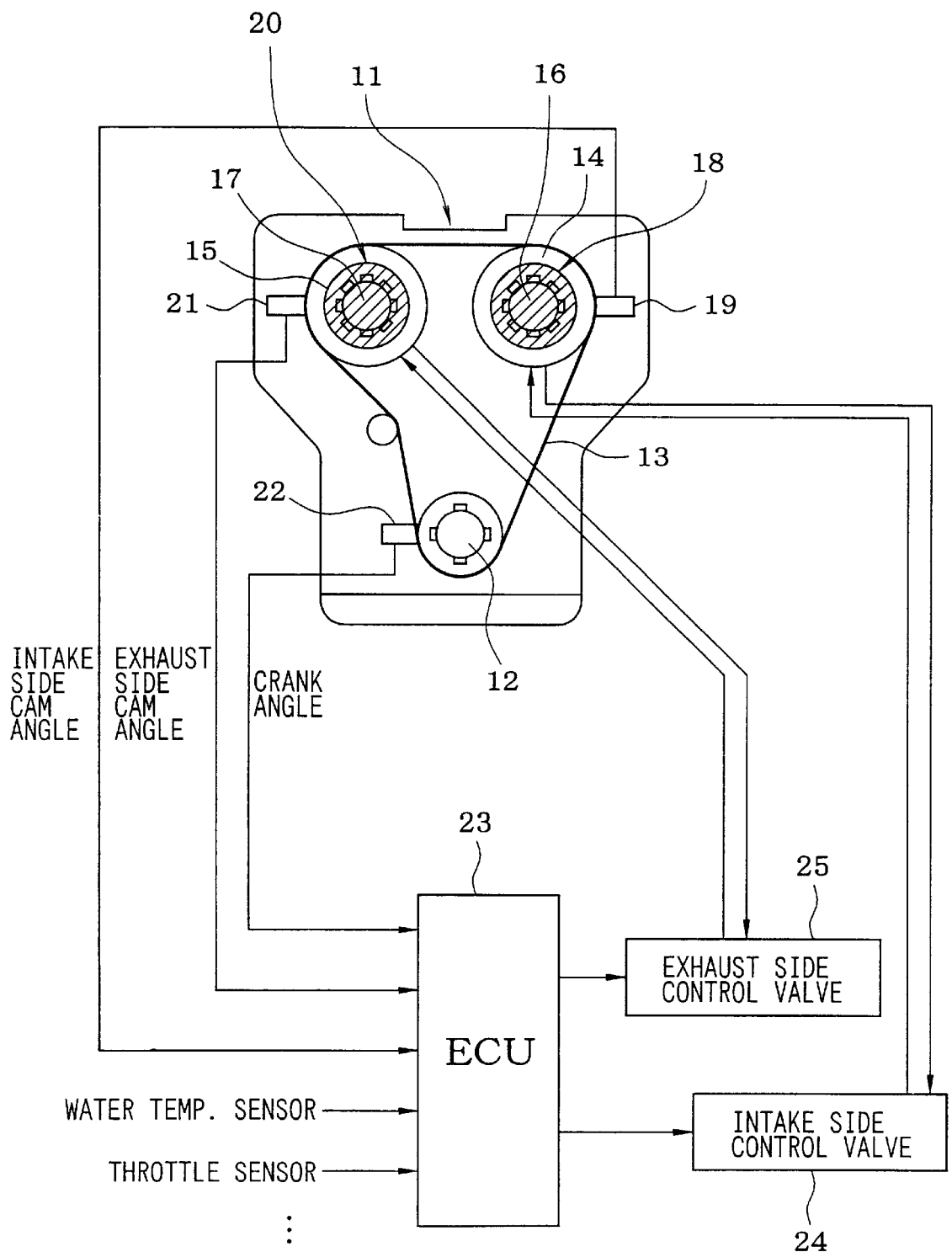
FIG. 1 is a schematic view showing a control system (first embodiment)

The first embodiment of the present invention will be explained with reference to FIGS. 1–10. FIG. 1 shows a schematic structure of the whole system. In a DOHC gasoline engine 11 which is an intake port-injection internal combustion engine, rotational force from a crankshaft 12 is transmitted to an intake-side camshaft 16 and an exhaust-side camshaft 17 through a timing chain 13 and sprockets 14, 15, respectively. The intake-side camshaft 16 is provided with an intake side hydraulically operated variable valve timing device 18 which adjusts the rotational phase of the intake-side camshaft 16 in relation to the crankshaft 12. The intake-side camshaft 16 is also provided with an intake-side cam angle sensor 19 which outputs a signal of the intake-side cam angle every predetermined specific cam angle. The exhaust-side camshaft 17 is provided with an exhaust side hydraulically operated variable valve timing device 20 which adjusts the rotational phase of the exhaust-side camshaft 17 in relation to the crankshaft 12. Furthermore the exhaust-side camshaft 17 is provided with an exhaust-side cam angle sensor 21 which outputs an exhaust-side cam angle signal every predetermined specific cam angle. The crankshaft 12 is provided with a crank angle sensor 22 which outputs a crank angle signal every predetermined specific crank angle.

Output signals from the crank angle sensor 22 and the intake- and exhaust-side cam angle sensors 19, 20 are inputted to an engine control circuit (ECU) 23. At the ECU 23, real valve timings of the intake and exhaust valves are calculated, and the engine speed is calculated based on a frequency of the crank angle signal from the crank angle sensor 22. Furthermore, signals outputted from miscellaneous sensors detecting an engine operating condition as an intake pipe pressure sensor, a water temperature sensor, a throttle sensor, etc. are also inputted to the ECU 23, whereby the target intake and exhaust valve timings (the target amount of advance of the intake-side camshaft 16 and the target amount of retard of the exhaust-side camshaft 17) are calculated based on the outputs of these miscellaneous sensors.

The ECU 23 performs the feedback control of the intake side variable valve timing device 18 by controlling the intake-side hydraulic control valve 24 so that the real valve timing of the intake valve (the real amount of advance of the intake-side camshaft 16) becomes the target advance amount, and also the feedback control of the exhaust side variable valve timing device 20 by controlling the exhaust-side hydraulic control valve 25 so that the real valve timing of the exhaust valve (the rear amount of retard of the exhaust-side camshaft 17) becomes the target retard amount.

Next, the structure of a phase change mechanism 63 of the exhaust-side variable valve timing device 20 will be explained with reference to FIGS. 2–7. A housing 31 is fixedly tightened by a bolt 32 to the sprocket 15 being rotatably supported on the outer periphery of the exhaust-side camshaft 17. Therefore the rotation of the crankshaft 12 is transmitted to the sprocket 15 and the housing 31 through the timing chain 13, so that the sprocket 15 and the housing 31 rotate in synchronism with the crankshaft 12.

The exhaust-side camshaft 17 is rotatably supported by a cylinder head 33 and a bearing cap 34, and a rotor 35 is securely tightened by a bolt 37 through a stopper 36 at one end portion of the exhaust-side camshaft 17. The rotor 35 is relatively rotatably installed within the housing 31.

Figure 2:
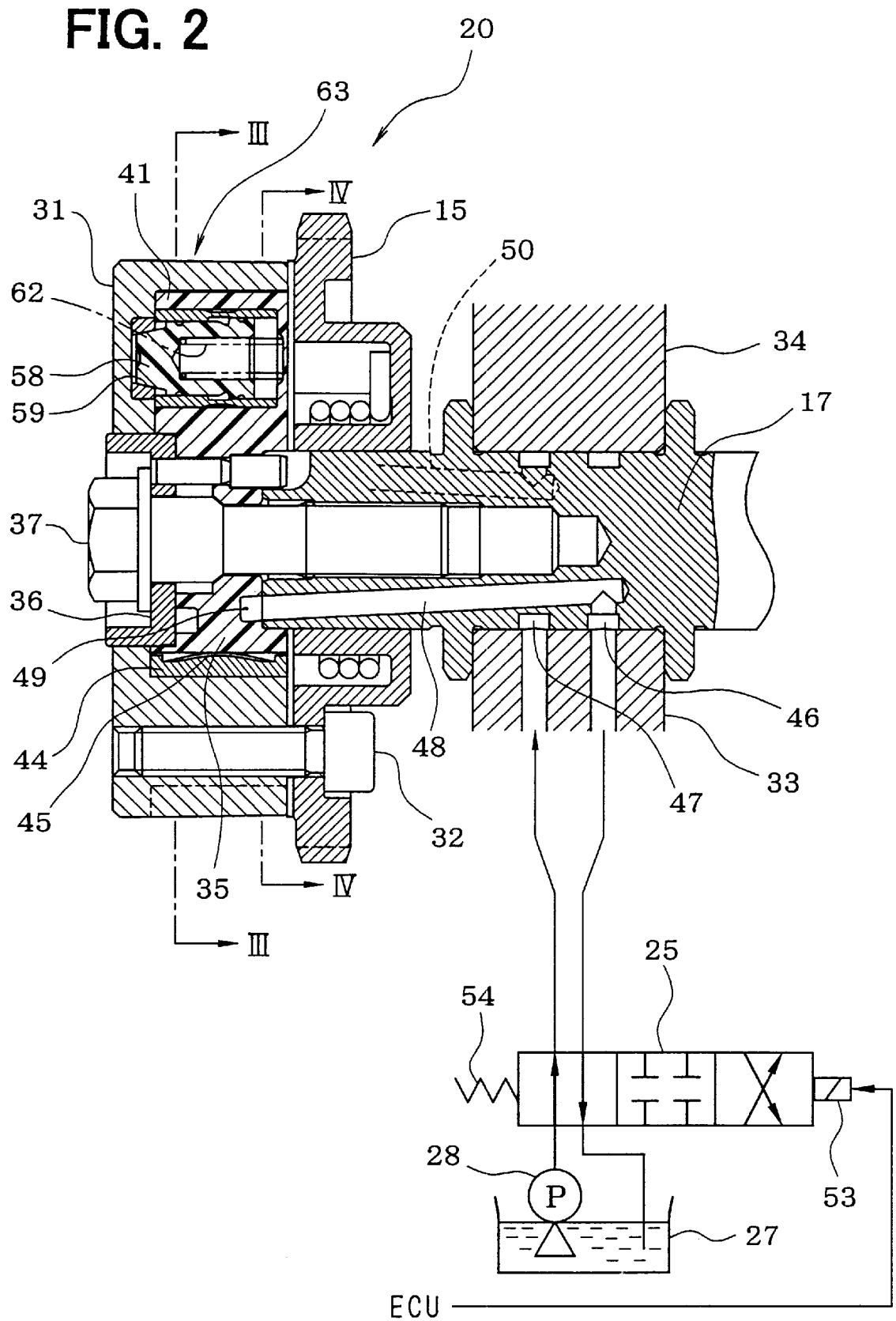
FIG. 2 is a cross sectional view showing a phase change mechanism (first embodiment)
Figure 3:
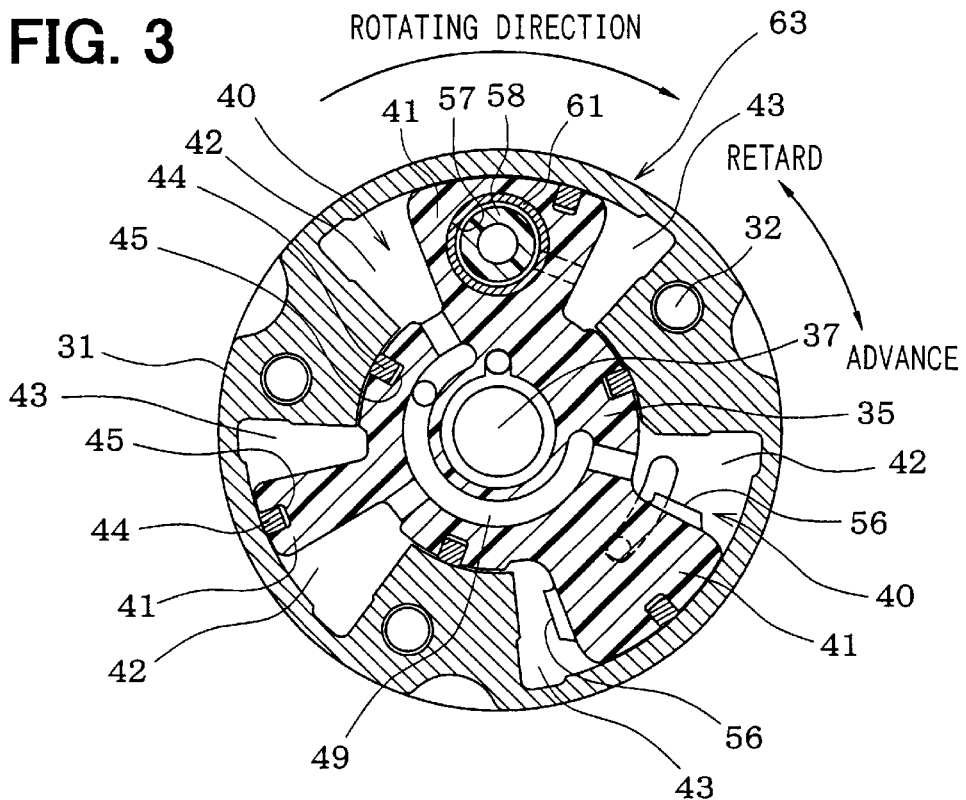
FIG. 3 is a cross sectional view taken along line III—III in FIG. 2 (first embodiment)
Figure 4:
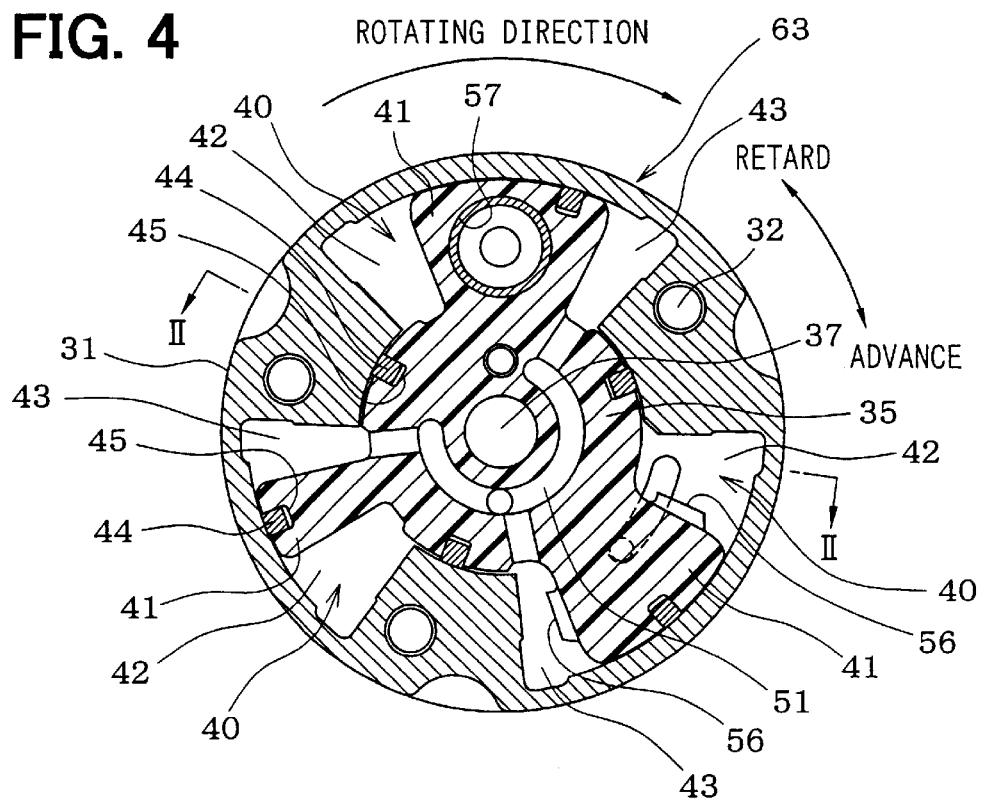
FIG. 4 is a cross sectional view taken along line IV—IV in FIG. 2 (first embodiment)

As shown in FIGS. 3 and 4, a plurality of fluid chambers 40 are formed within the housing 31. Each fluid chamber 40 is divided by a vane 41 formed on the outer periphery of the rotor 35 into an advance chamber 42 and a retard chamber 43. On either of the outer periphery of the rotor 35 and the outer periphery of the vane 41, a seal member 44 is provided. The seal member 44 is pressed toward the outer periphery by means of a leaf spring 45 (see FIG. 2), to thereby seal a clearance between the outer peripheral surface of the rotor 35 and the inner peripheral surface of the housing 31 and a clearance between the outer peripheral surface of the vane 41 and the inner peripheral surface of the fluid chamber 40.

As shown in FIG. 2, an annular advance angle groove 46 and an annular retard angle groove 47 formed within the outer periphery of the exhaust-side camshaft 17 are connected to specific ports of the hydraulic control valve 25. When an oil pump 28 is driven by the engine 11, the oil drawn up from an oil pan 27 is supplied into the advance angle groove 46 and the retard angle groove 47 through the oil pressure control valve 25. The advance angle oil path 48 connected to the advance angle groove 46 is so formed as to pass through the inside of the exhaust-side camshaft 17 to be connected to a circular advance angle oil path 49 (see FIG. 3) formed in the left side surface of the rotor 35. The circular advance angle oil path 49 is connected to each advance angle chamber 42. A retard angle oil path 50 connected to the retard angle groove 47 is formed to pass through the inside of the exhaust-side camshaft 17, being connected to a circular retard angle oil path 51 (see FIG. 4) formed in the right side surface of the rotor 35. The circular retard angle oil path 51 is connected to each retard angle chamber 43.

The hydraulic control valve 25 is a four-port three-position changeover valve, and the valve body of which is driven by a solenoid 53 and a spring 54. The valve body switches the position to supply the oil pressure to the advance angle chamber 42, the position to supply the oil pressure to the retard angle chamber 43, and the position in which no oil pressure is supplied to either of the advance angle chamber 42 and the retard angle chamber 43. When the solenoid 53 is not energized, the valve body is automatically changed over by the spring 54 to the position to supply the oil pressure to the retard angle chamber 43, so that the oil pressure acts in a direction in which the camshaft phase will be retarded.

When the oil pressure over a specific pressure is supplied to the advance angle chamber 42 and the retard angle chamber 43, the vane 41 is locked by the oil pressure in the advance angle chamber 42 and the retard angle chamber 43. The rotational motion of the housing 31 caused by the rotation of the crankshaft 12 is transmitted to the rotor 35 (vane 41) through the oil, whereby the exhaust-side camshaft 17 is driven to rotate with the rotor 35. During engine operation, the oil pressure in the advance angle chamber 42 and the retard angle chamber 43 are controlled by the oil pressure control valve 25, to relatively rotate the housing 31 and the rotor 35 (vane 41),thereby variably controlling the phase of rotation of the exhaust-side camshaft 17 relative to the crankshaft 12, that is, the phase of the exhaust valve timing in relation to the crank angle.

On both sides of one of the vanes 41, a stopper portion 56 is formed for restricting the range of relative rotation of the rotor 35 (vane 41) with respect to the housing 31 as shown in FIGS. 3 and 4. The stopper portion 56 restricts the most retarded phase and the most advanced phase of the camshaft. Furthermore, in the cylindrical member 61 fitted in the inner periphery of the lock pin hole 57 formed in the other vane 41, a lock pin 58 is inserted for locking the relative rotation of the housing 31 and the rotor 35 (vane 41). The lock pin 58 fits in a lock hole 59 (see FIG. 2) provided in the housing 31, thereby locking the camshaft phase at around the middle position (intermediate lock phase) of the adjustable range. The intermediate lock phase is set in a phase suitable for engine starting.

When the engine stops, the lock pin 58 is held in the lock position by a spring 62. Therefore, the engine is started with the lock pin 58 held in the lock position. After starting up the engine, the lock pin 58 is unlocked by the oil pressure. During engine operation, the lock pin 58 is kept in the unlocked position by the oil pressure, and the housing 31 and the rotor 35 are in a relatively rotatable state (that is, in a state the variable valve timing is controllable).

Here, the intake-side variable valve timing device 18 is of the same configuration as the exhaust-side variable valve timing device 20.

Figure 5:
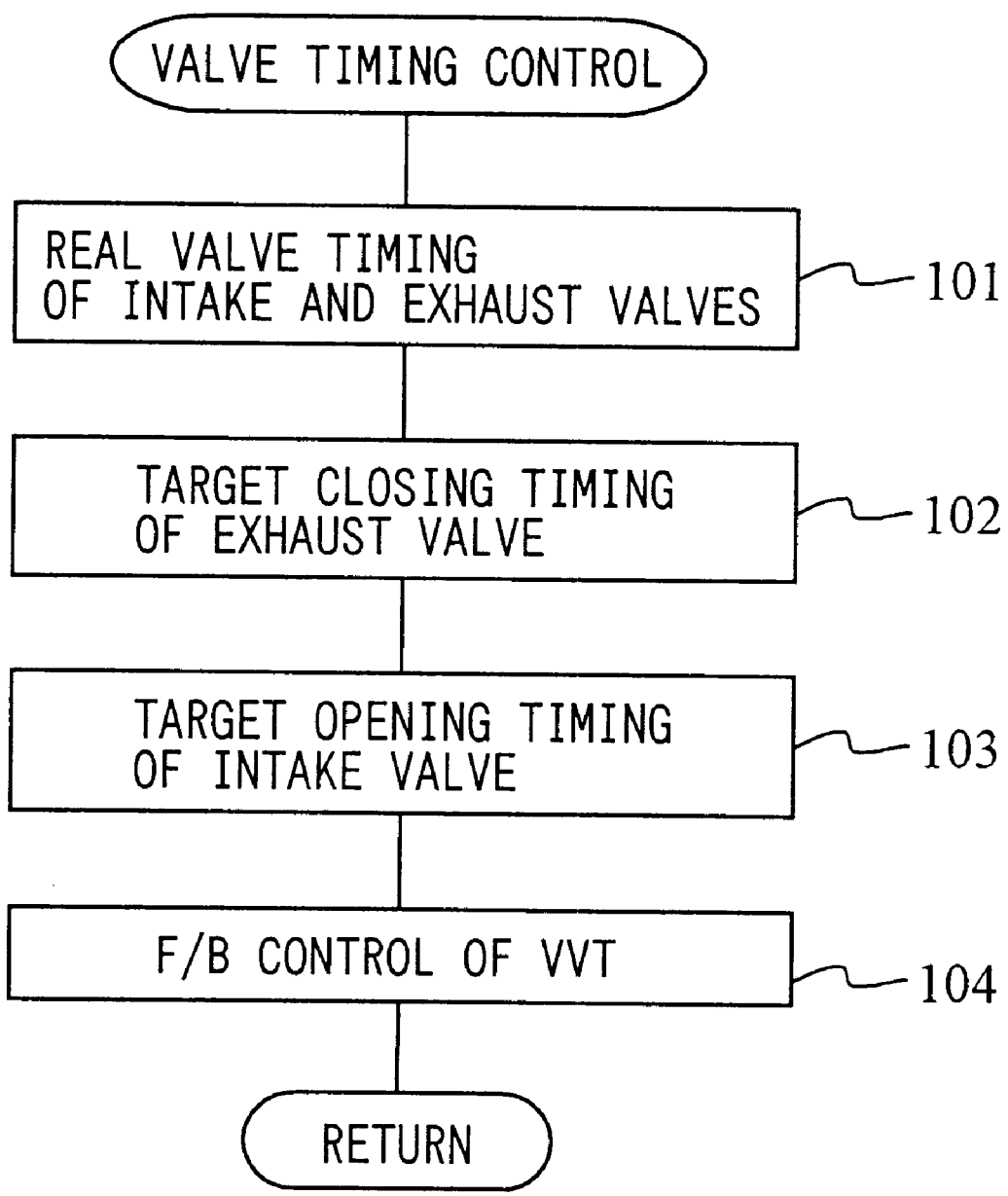
FIG. 5 is a flow chart showing a flow of a valve timing control program (first embodiment)

The ECU 23 controls the exhaust and intake valve timings by executing a valve timing control program of FIG. 5 stored in a built-in ROM (a storage medium). The program is executed every predetermined time, and performs as a valve timing control means in the present invention. Upon starting the program, at STEP 101, the ECU 23 calculates the real valve timing of either of the intake valve and the exhaust valve in accordance with output signals from the crank angle sensor 22 and the cam angle sensors 19, 21.

Subsequently at STEP 102, a target exhaust valve closing timing map is retrieved. The target exhaust valve closing timing map uses the engine speed NE and load F shown in FIG. 6 as parameters. The ECU 23 finds the target valve closing timing of the exhaust valve in accordance with the current engine speed NE and load F. Here, the load F is calculated based on one or more of the throttle opening, intake pipe pressure and intake air amount.

Figure 6:
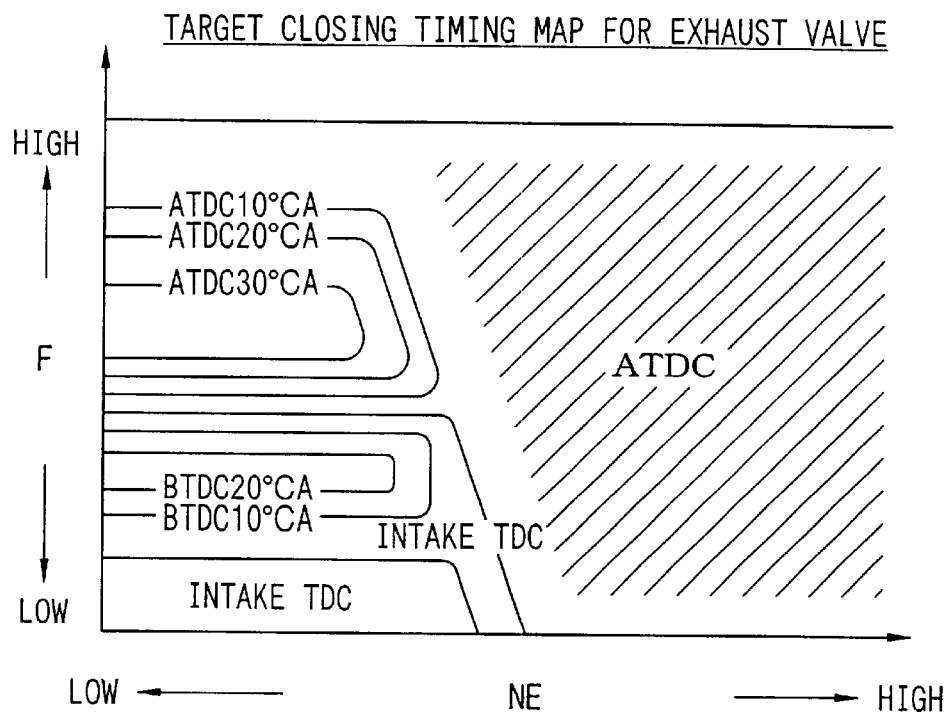
FIG. 6 is a target exhaust valve closing timing map (first embodiment)

The target exhaust valve closing timing map in FIG. 6 is set as follows. At the low-speed and low-load range, the target valve closing timing of the exhaust valve is set to be retarded again to intake TDC after an advance from the intake TDC to BTDC 20° CA (20° CA before TDC) with an increase in the load F. At the low-speed, medium- and high-load range, the target valve closing timing of the exhaust valve is set to be retarded again to around the intake TDC (on ATDC side) after an advance from the intake TDC to ATDC 30° CA (30° CA after TDC). Here, at the high-speed range, the target valve closing timing of the exhaust valve is set on ATDC side regardless of the load F.

Next, the program proceeds to STEP 103, where the target intake valve opening timing map is retrieved. The target intake valve opening timing map uses the engine speed NE and load F shown in FIG. 7 as parameters. The ECU 23 finds the target valve opening timing of the intake valve in accordance with the current engine speed NE and load F.

Figure 7:
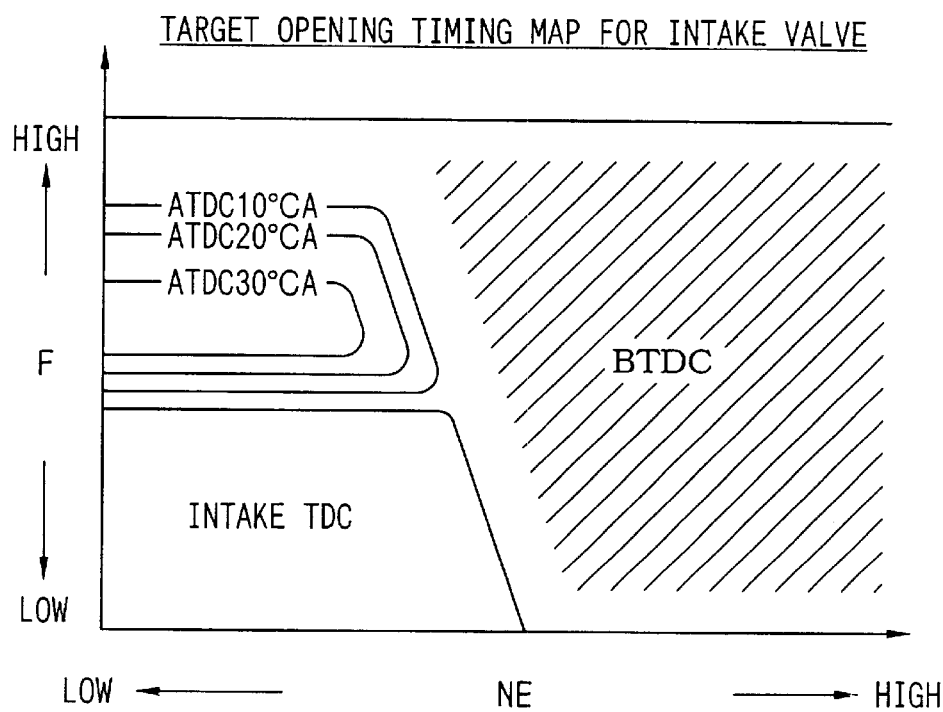
FIG. 7 is a target intake valve opening timing map (first embodiment)

The target intake valve opening timing map shown in FIG. 7 is set as follows. At the low-speed and low-load range, the target valve opening timing of the intake valve is set nearly at the intake TDC. At the low-speed, medium- and high-load range, the target valve opening timing of the intake valve is set to advance again to around the intake TDC (on the ATDC side) after retarded from the intake TDC to ATDC 30° CA with an increase in the load F. Here, at the high-speed range, the target valve opening timing of the intake valve is set on the BTDC side regardless of the load F.

Then the program proceeds to STEP 104, where the hydraulic control valve 25 of the exhaust-side variable valve timing device 20 is controlled by the feed-back control system so that the real valve closing timing of the exhaust valve becomes the target valve closing timing, and also the hydraulic control valve 24 of the intake-side variable valve timing device 18 is controlled by the feed-back control system so that the real valve opening timing of the intake valve becomes the target valve opening timing.

Next, an example of the valve timing control executed in the above-described first embodiment will be explained with reference to FIGS. 8A, 8B, 9A and 9B.

Figure 8A:
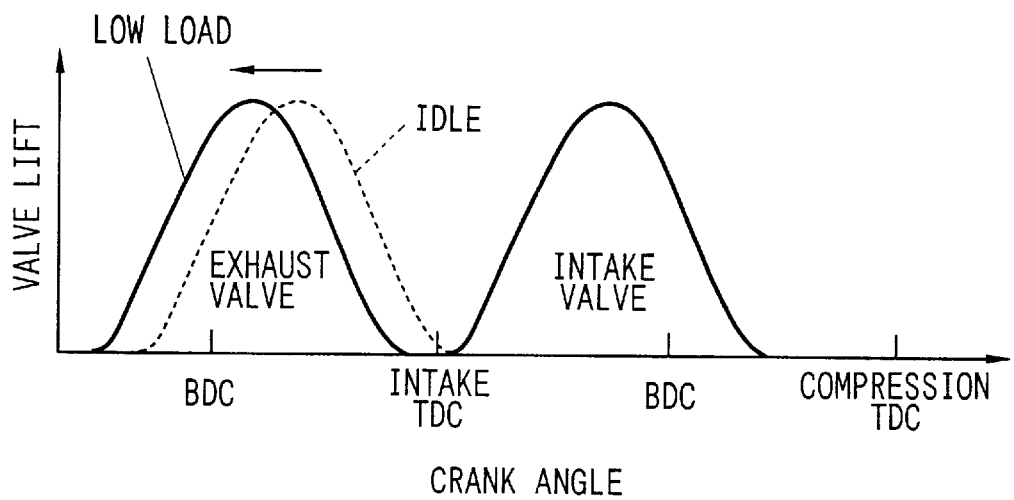
FIG. 8A is a graph showing valve timing characteristics (first embodiment)
Figure 8B:
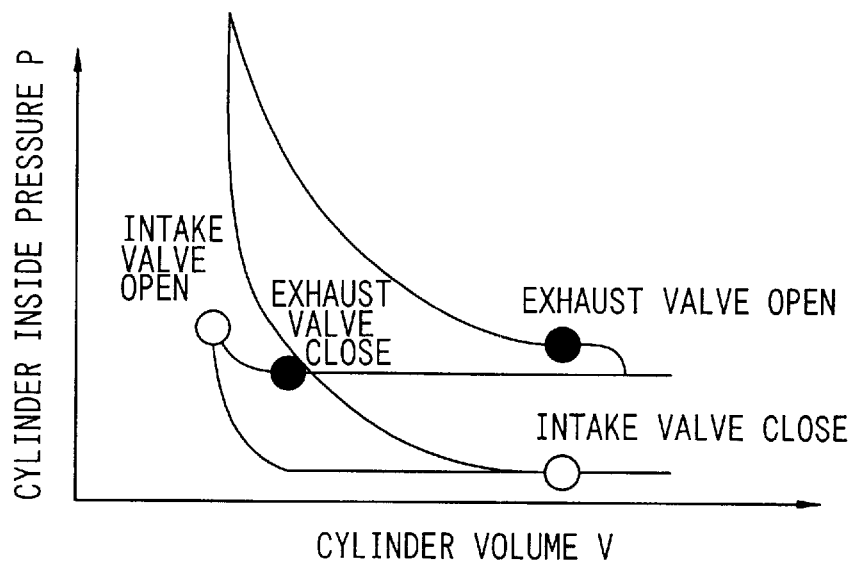
FIG. 8B is a graph showing cylinder pressure and volume variation characteristics (first embodiment)

FIGS. 8A and 8B show an example of control to be performed when the engine is running within the low-speed, low-load range (but higher load range than that during idling). In this case, as shown in FIG. 8A, an exhaust valve advanced-closing control is executed, the exhaust valve is closed at an earlier timing than the intake TDC. The intake valve is opened nearly at the intake TDC.

In this way, when the exhaust valve is closed at an earlier timing than the intake TDC, combustion gases remaining in the cylinder are trapped in the cylinder, and become internal EGR gases. At this time, the intake valve is held closed for a certain time after the trapping of the residual gases. Therefore, unlike the internal EGR by the conventional valve overlap, it is possible to prevent a temperature drop of the residual gases caused by the trapping of the intake air. Further, it is possible to compress by the piston the residual gases in the cylinder during a period from the closing of the exhaust valve until the opening of the intake valve (intake TDC), thereby enabling to raise the residual gas temperature (see FIG. 8B). Therefore, even when the internal EGR (exhaust valve advanced-closing control) is executed during low-load operation, the air mixture can be taken into the cylinder with cylinder temperatures set higher than the conventional internal EGR. Thus, fuel atomization within the cylinder is improved to perform fuel combustion in a stabilized status. Accordingly, even when the internal EGR (exhaust valve advanced-closing control) is performed during low-load operation, worsening of emissions caused by deteriorated combustion can be prevented. Furthermore, engine vibration can be reduced to achieve improved drivability. In addition, it is possible to enhance fuel economy by the stabilization of combustion and the internal EGR.

It is to be noted that, in the present first embodiment, the intake valve is controlled to be opened at around the intake TDC during the exhaust valve advanced-closing control. Alternatively, the intake valve may be controlled to be opened at a later timing than the intake TDC.

During idle operation, as indicated by a dotted line in FIG. 8A, the exhaust valve is closed at around the intake TDC, thereby decreasing the amount of residual gases during the idling operation to less than that during the exhaust valve advanced-closing control. During the idling operation, stabilized combustion is achieved while residual gases amount is small, thereby enabling to improve idling stability, reducing vibration during idling operation, and decreasing the amount of unburned components to be exhausted during idling operation.

Figure 9A:
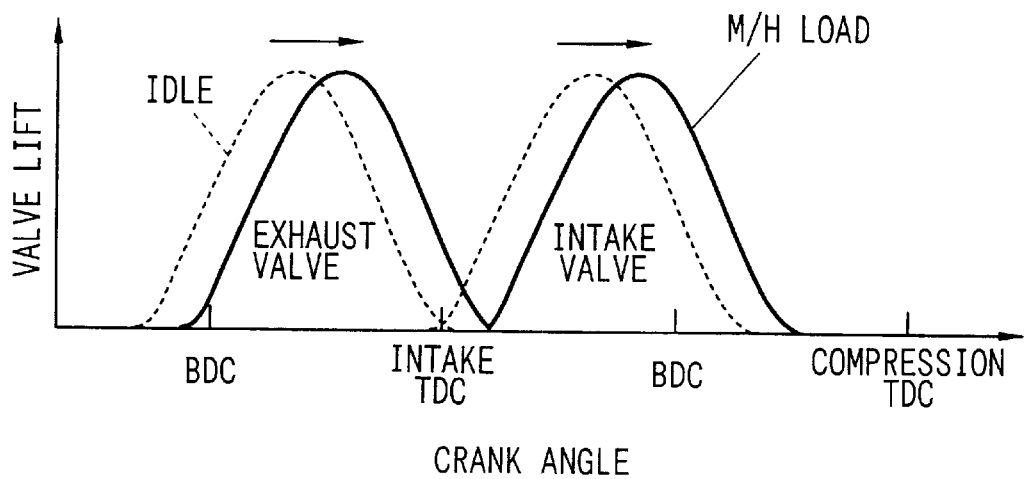
FIG. 9A is a graph showing valve timing characteristics (first embodiment)
Figure 9B:
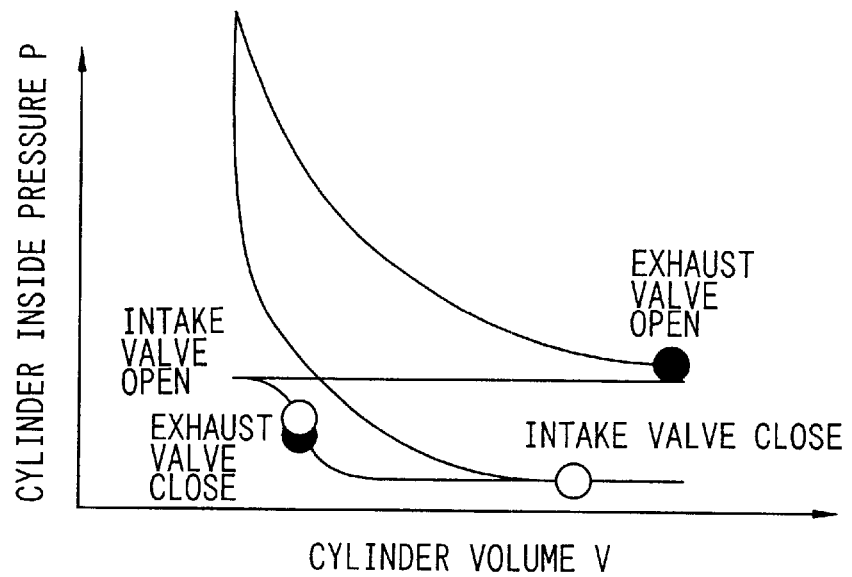
FIG. 9B is a graph showing cylinder pressure and volume variation characteristics (first embodiment)

FIG. 9 shows an example of control during engine operation in the medium/high-load range or in the high-speed range. In this case, as shown in FIG. 9A, the exhaust valve retarded-closing control is executed, so that the exhaust valve is closed at a later timing than the intake TDC. The intake valve is opened at a later timing than the intake TDC.

In the exhaust valve advanced-closing control, since the residual gases are compressed, a pumping loss is increased by the same amount of the compressed residual gases. Thus, during the medium/high-load operation or during high-speed operation in which a relatively large engine output is required, the exhaust valve closing timing is set at around intake TDC or later timing, thereby decreasing the pumping loss to increase the engine output. Exhaust gases are drawn again from the exhaust system into the cylinder during a period from the intake TDC till the closing of the exhaust valve to sufficiently attain the internal EGR, thereby improving the fuel economy.

Figure 10:
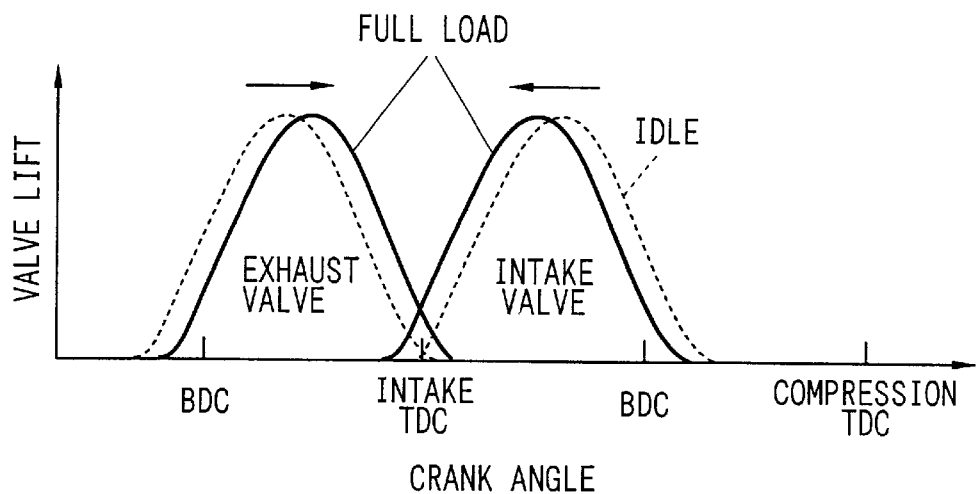
FIG. 10 is a graph showing valve timing characteristics (first embodiment)

Furthermore, in the present first embodiment, as shown in FIG. 9, when the engine is operating in the medium/high-load range, the intake valve is opened after the intake TDC to lessen the amount of intake air, thereby increasing the amount of residual gases in the cylinder to improve the fuel consumption ratio. Alternatively, as shown in FIG. 10, in the full-load range of the high-load range, the amount of intake air may be increased by giving priority to the attainment of the engine output, and by opening the intake valve at an earlier timing than the intake TDC to start the supply of the intake air into the cylinder at as an advanced timing as possible.

In the first embodiment, the exhaust valve timing is changed during the exhaust valve advanced-closing control in accordance with the engine speed NE and load F. Therefore, residual gases amount and cylinder temperature during the exhaust valve advanced-closing control are appropriated in accordance with the driving state. It is therefore possible to prevent exhaust emissions from worsening due to an excessive amount of residual gases, and also to prevent occurrence of engine knock caused by excessive rise of the cylinder temperature.

It is also to be noted that the exhaust valve timing may be changed during the exhaust valve advanced-closing control while considering the cooling water temperature, combustion roughness (combustion instability), etc. beside the engine speed NE and load F.

Furthermore, it may improve fuel economy while stabilizing the state of combustion by performing the exhaust valve advanced-closing control during deceleration (except during fuel cut-off), and also to decrease the pumping loss to increase the engine output by performing the exhaust valve retarded-closing control during acceleration.

(Second Embodiment)

Next, the second embodiment of the present invention will be explained with reference to FIGS. 11–13.

As described in the first embodiment, when the exhaust valve advanced-closing control is executed by the use of a phase change mechanism 63, the exhaust valve opening timing is advanced by the same amount of advance of the exhaust valve closing timing as shown in FIG. 8A. Therefore, as shown in FIG. 8B, the timing of an expansion stroke end is advanced to commence exhaust before the completion of work of the combustion gases, thereby reducing an effect of improvement of fuel economy.

Figure 11:
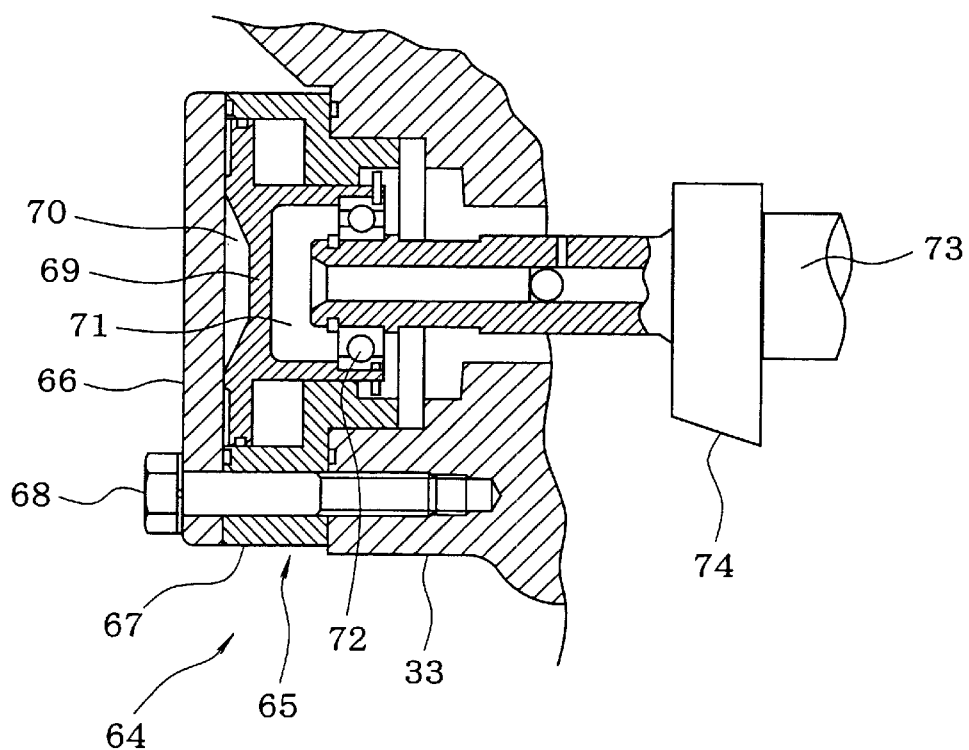
FIG. 11 is a partial cross sectional view showing an operation angle variation mechanism (second embodiment)

In the present second embodiment, as shown in FIG. 11, an exhaust-side variable valve timing device 64 is provided with, besides the phase change mechanism 63, an operation angle change mechanism 65 which changes the operation angle of the exhaust valve, thereby performing the exhaust valve advanced-closing control by changing only the valve closing timing almost without changing the exhaust valve opening timing.

First, the structure of the operation angle change mechanism 65 will be explained. In the cylinder head 33, a cover 66 is fixed to a cylinder member 67 by a bolt 68 in a position on the opposite side of the phase change mechanism 63 mounting position. An oil pressure chamber formed in the cover 66 and the cylinder member 67 is divided by a piston member 69 into two oil pressure chambers 70 and 71. The piston member 69 is rotatably mounted on the outer periphery of the forward end portion of an exhaust-side camshaft 73 through a bearing 72, and the exhaust-side camshaft 73 is so mounted as to be axially movable together with the piston member 69. On the exhaust-side camshaft 73, an exhaust cam 74 for driving to open and close the exhaust valve is secured. The exhaust cam 74 is axially formed to have a different profile. The oil pressure in the oil pressure chambers 70 and 71 is controlled by an oil pressure control valve (not illustrated), to axially move the exhaust-side camshaft 73, thereby changing the profile of the exhaust cam 74 to change the operation angle (the valve opening period) of the exhaust valve. The remaining structure is the same as in the first embodiment.

In the present second embodiment, the exhaust valve timing is controlled based on the target exhaust valve opening timing map using the engine speed NE and load F shown in FIG. 12 as parameters in addition to the target exhaust valve closing timing map of FIG. 6.

The target exhaust valve timing map of FIG. 12 is so set as to advance from BBDC 20° CA to BBDC 70° CA with an increase of the engine speed NE and load F.

Figure 13A:
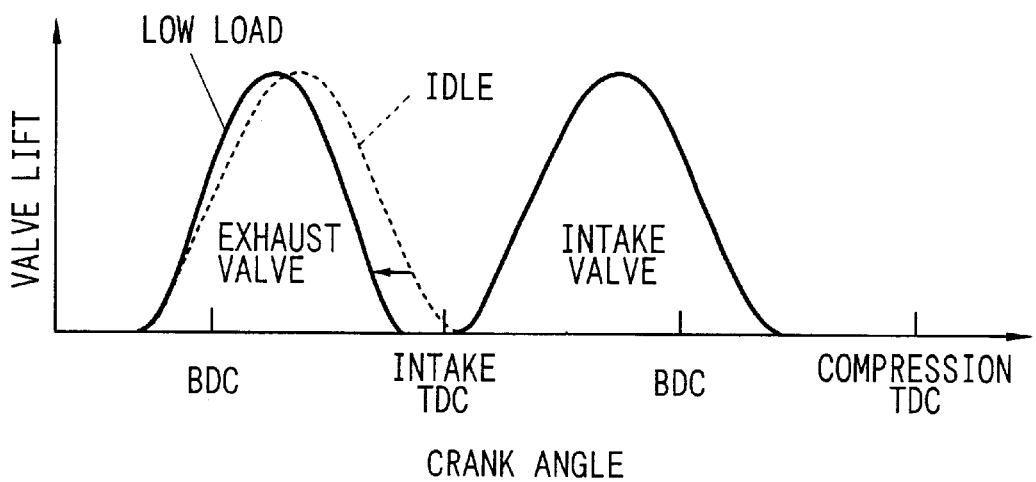
FIG. 13A is a graph showing valve timing characteristics (second embodiment)
Figure 13B:
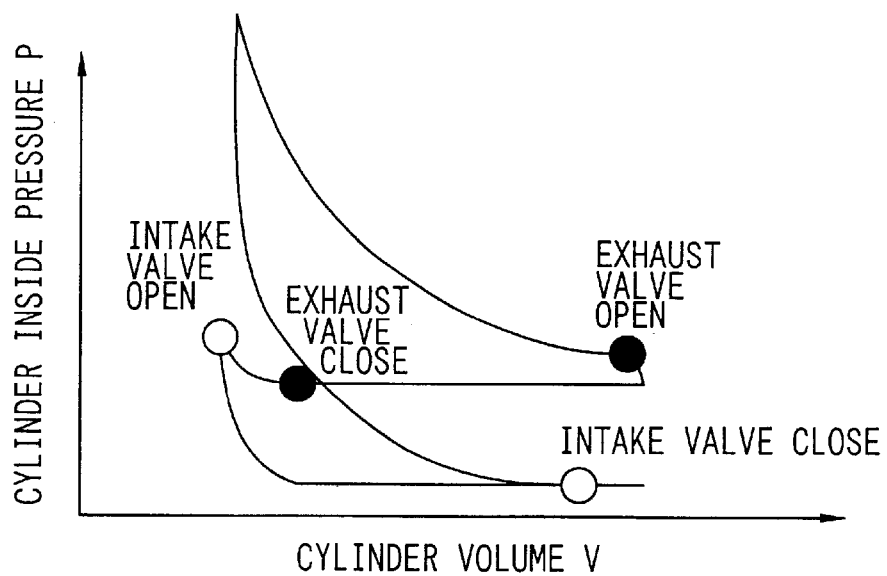
FIG. 13B is a graph showing cylinder pressure and volume variation characteristics (second embodiment)

FIG. 13 shows an example of control during engine operation in a low-speed and low-load range (but higher-load range than idling). In this case, as shown in FIG. 13A, the exhaust valve advanced-closing timing control is executed. The exhaust valve closing timing is advanced earlier than intake TDC. The exhaust valve opening timing is held at around the same timing as during idling, thereby enabling to prevent advancing the timing of the expansion stroke end as shown in FIG. 13B, to prevent the effective work of combustion gases from decreasing, and to improve the fuel economy.

(Third Embodiment)

In the third embodiment, an intake-side variable valve timing device (not illustrated) is also provided with a phase change mechanism and an operation angle change mechanism. Remaining structure in the third embodiment is the same as in the second embodiment.

In the present third embodiment, the intake valve timing is controlled based on, in addition to the target intake valve opening timing map shown in FIG. 7, a target intake valve closing timing map using the engine NE and load F shown in FIG. 14 as parameters.

The target intake valve closing timing map of FIG. 14 is set so that, with a decrease in the engine speed NE and load F, the target intake valve closing timing is advanced from ABDC to BBDC 90° CA. In this case, at the low-speed part-load range, the target intake valve closing timing is set to advance from BDC to BBDC 90° CA with a decrease in the load F, and is set on ABDC side at the full-load range.

Figure 15A:
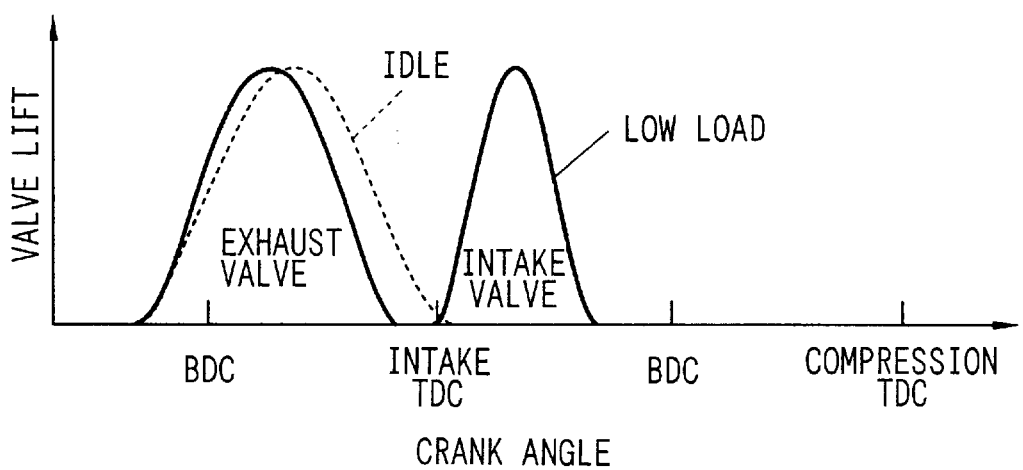
FIG. 15A is a graph showing valve timing characteristics (third embodiment)
Figure 15B:
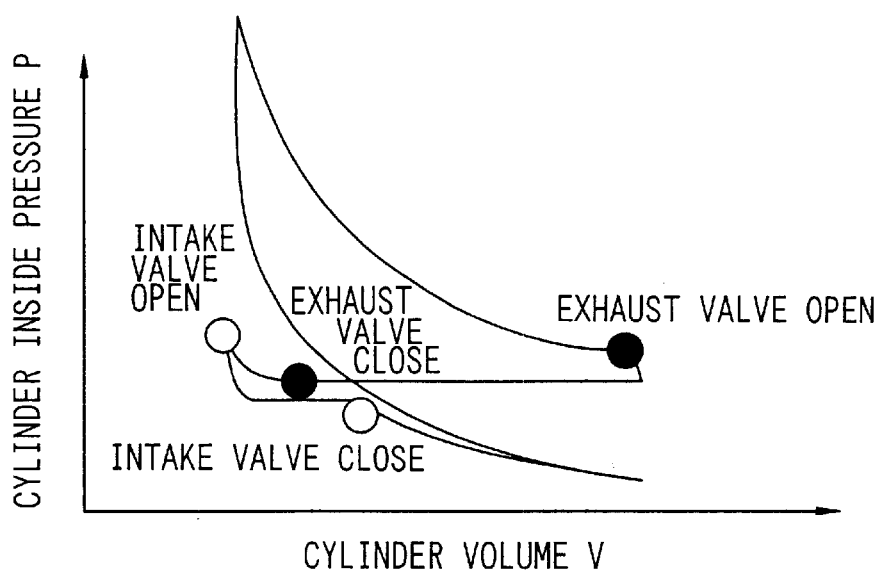
FIG. 15B is a graph showing cylinder pressure and volume variation characteristics (third embodiment)
Figure 16A:
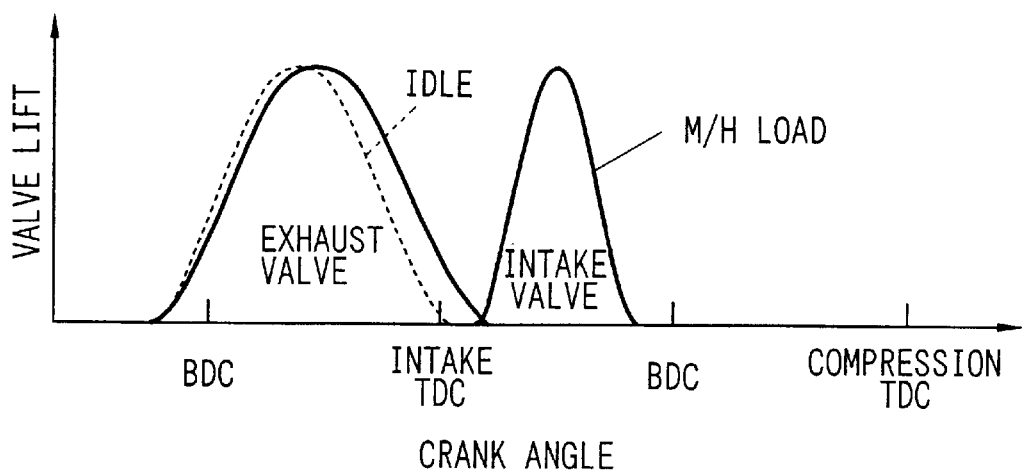
FIG. 16A is a graph showing valve timing characteristics (third embodiment)
Figure 16B:
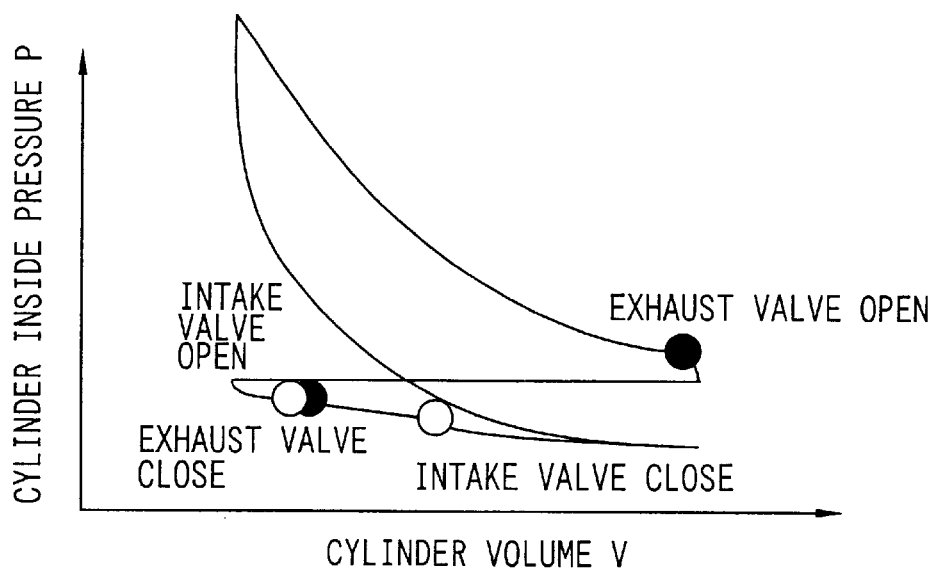
FIG. 16B is a graph showing cylinder pressure and volume variation characteristics (third embodiment)

FIGS. 15A and 15B show an example of control to be performed when the engine is operating in the low-speed and low-load range (but higher load-range than idling). FIGS. 16A and 16B show an example of control to be performed when the engine is operating in the low-speed and medium/high-load range (except the full-load range). When the engine is running in the low-speed and part-load range, the intake valve is closed at an earlier timing than BDC as shown in FIGS. 15A and 16A. In this way, the intake valve is closed at an earlier timing than BDC, the effective compression ratio can be decreased, thereby reducing the pumping loss and improving fuel consumption ratio. Here, as shown in FIGS. 15A and 15B, it is also possible to stabilize and suppress worsening of the state of combustion by raising the cylinder temperature by the exhaust valve advanced-closing control, even when the intake valve is early closed to decrease the effective compression ratio during the exhaust valve advanced-closing control.

Figure 17:
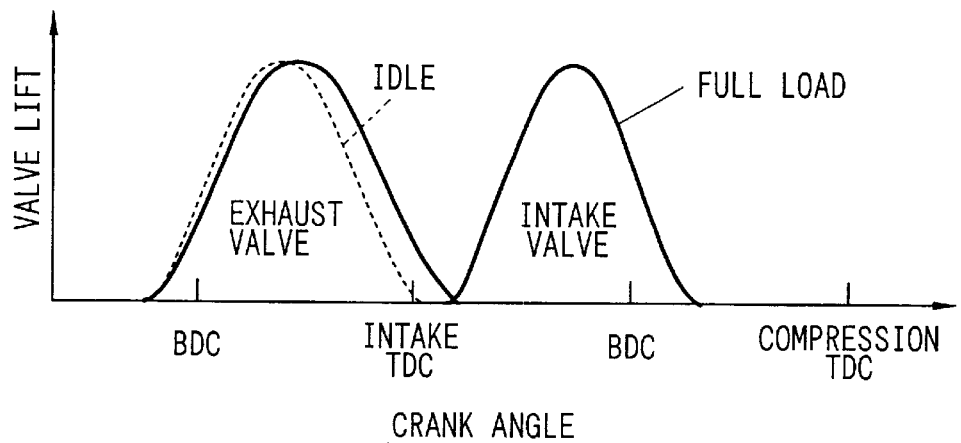
FIG. 17 is a graph showing valve timing characteristics (third embodiment)

FIG. 17 shows an example of control to be performed when the engine is operating in the full-load range. In this case, the intake valve is closed at a later timing than BDC, whereby the intake air is filled by inertia into the cylinder to increase the amount of intake air even after BDC. Thus, it is possible to attain an engine output demanded during the full-load operation.

(Fourth Embodiment)

According to the above-described first through third embodiment, the exhaust valve advanced-closing control is performed in the intake port-injection internal combustion engine. However, in the present fourth embodiment, the exhaust valve advanced-closing control is carried out in the direct injection gasoline engine in which fuel is injected into the cylinder.

Figure 18:
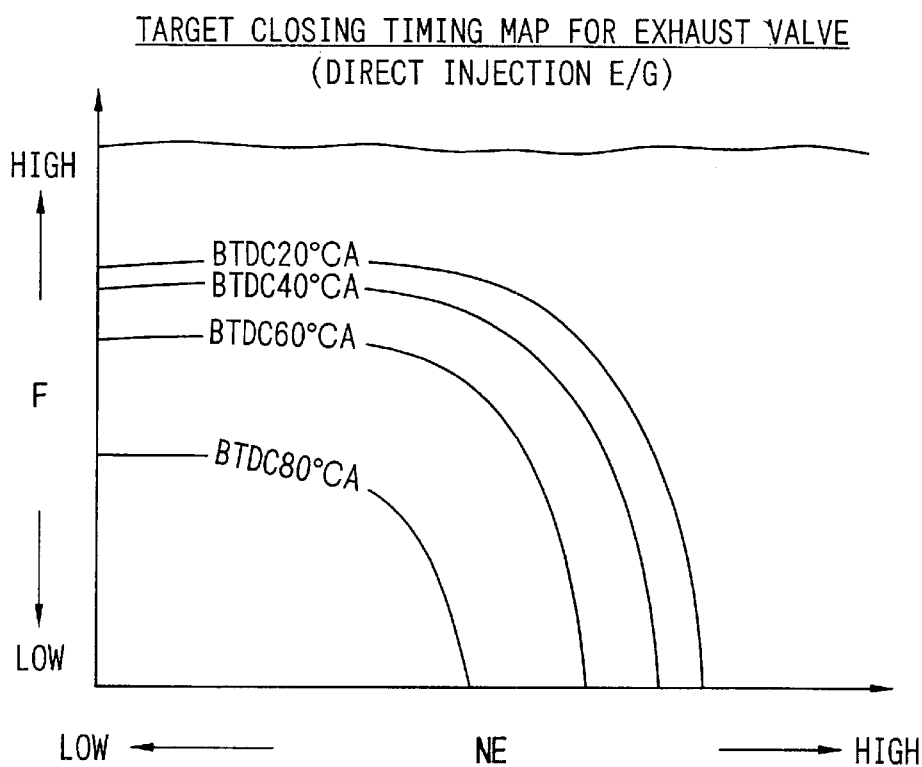
FIG. 18 is a target exhaust valve closing timing map (fourth embodiment).

In the present fourth embodiment, the exhaust valve advanced-closing control is executed based on the target exhaust valve closing valve timing map using the engine speed E and load F shown in FIG. 18 as parameters. The target exhaust valve timing map of FIG. 18 is set so as to advance to BTDC 80° CA with a decrease in the engine speed NE and load F.

In the direct injection engine, fuel is injected to the vicinity of a spark plug to form a stratified air-fuel mixture for stratified combustion. Therefore, fuel combustion is stabilized even by increasing the amount of internal EGR gases (amount of residual gases) in comparison with the intake port-injection engine. However, the direct injection engine is designed such that the top end face of the piston strokes very close to the upper surface of the combustion chamber around the intake TDC for increasing a compression ratio. Therefore, in the conventional internal EGR control by valve overlap, when the exhaust valve closing timing is excessively retarded or when the intake valve opening timing is excessively advanced, the exhaust valve or the intake valve collides against the piston in the vicinity of the intake TDC, thereby failing to increase the amount of internal EGR gases.

However, in the present fourth embodiment, the exhaust valve advanced-closing control of the cylinder injection engine is performed to control the exhaust valve closing timing to the advance side from the intake TDC. Thus, even when the amount of advance is increased to increase the amount of residual gases, it is possible to prevent the exhaust valve from colliding against the piston. Therefore, the exhaust valve closing timing can be advanced to BTDC 80° CA at the maximum, at which the amount of hot residual gases can be increased, thereby raising the cylinder temperature to improve combustibility and decreasing the amount of unburned exhausted components.

In a diesel engine also, the exhaust valve advanced-closing control may be carried out. The compression ratio of the diesel engine is higher than that of the direct injection engine, so that such a problem as a collision of the piston against the intake and exhaust valves arises. Thus, conventional methods could not increase the amount of the internal EGR gases (amount of residual gases). However, according to the exhaust valve advanced-closing control of the present invention, the amount of residual gases is increased to improve the EGR effect, and NOx and PM (particulate material) can be reduced simultaneously.

Furthermore, in a lean-burn engine in which the air-fuel mixture ratio in the cylinder is controlled to the lean side, the exhaust valve advanced-closing control maybe used. In this case, the lean combustion limit of the fuel mixture in the cylinder can be extended to the lean side by stabilizing the state of combustion by the exhaust valve advanced-closing control, thereby improving fuel economy and reducing exhausted NOx.

(Modifications)

According to the above-described first through fourth embodiments, the exhaust valve advanced-closing control is performed during the low-load operation. Alternatively, the exhaust valve advanced-closing control may be performed during part-load operation. During the part-load operation, intake air amount is small and residual gas ratio is large in comparison with during full-load operation. Thus, it is possible to effectively increase the cylinder temperature to stabilize the state of combustion by performing the exhaust valve advanced-closing control.

Furthermore, in case of knocking, the exhaust valve advanced-closing control may be prohibited, and the exhaust valve retarded-closing control may be executed or the exhaust valve closing timing may be controlled to the retard side. By this, the cylinder temperature, in case of knocking, can be decreased below the cylinder temperature during the exhaust valve advanced-closing control. Accordingly it is possible to restrain the occurrence of knocks.

Furthermore, according to the present invention, the variable valve timing device may be adopted in the exhaust-side camshaft, and only the valve timing of the exhaust valve may be varied.

What is claimed is:

1. A variable valve timing control device for an internal combustion engine, comprising:
   a variable valve timing device which changes a valve timing of an exhaust valve of said internal combustion engine; and
   a valve timing control means which controls said variable valve timing device, wherein
   said variable valve timing control means executes an exhaust valve advanced-closing control to control an exhaust valve closing timing to an advance side of an intake top dead center.

2. A variable valve timing control device according to claim 1, wherein said valve timing control means executes the exhaust valve advanced-closing control during part-load operation.

3. A variable valve timing control device according to claim 1, wherein said valve timing control means controls the exhaust valve closing timing during the exhaust valve advanced-closing control to an advance side of the exhaust valve closing timing during idling.

4. A variable valve timing control device according to claim 1, wherein said variable valve timing device includes a phase change mechanism which changes a phase of the valve timing of said exhaust valve.

5. A variable valve timing control device according to claim 1, wherein said variable valve timing device includes an operation angle change mechanism which changes an operation angle of said exhaust valve.

6. A variable valve timing control device according to claim 1, wherein air-fuel ratio of mixture gas in a cylinder of said internal combustion engine is controlled to lean side of a theoretical air-fuel ratio.

7. A variable valve timing control device for an internal combustion engine according to claim 6, wherein said internal combustion engine is a direct injection engine in which fuel is injected into the cylinder.

8. A variable valve timing control device for an internal combustion engine according to claim 6, wherein said internal combustion engine is a diesel engine.

9. A variable valve timing control device according to claim 1, wherein said valve timing control means controls the exhaust valve closing timing during the exhaust valve advanced-closing control based on an engine speed and an engine load.

10. A variable valve timing control device according to claim 1, wherein
said variable valve timing device is provided on either of intake and exhaust sides of said internal combustion engine,
said valve timing control means controls an intake valve opening timing during the exhaust valve advanced-closing control to around the intake top dead center or to a retard side of the intake top dead center.

11. A variable valve timing control device according to claim 10, wherein said valve timing control means controls an intake valve closing timing during the exhaust valve advanced-closing control to an advance side of bottom dead center.

12. A variable valve timing control device according to claim 1, wherein
said valve timing control means executes the exhaust valve closing timing to around the intake top dead center during idling operation,
said valve timing control means executes the exhaust valve advanced-closing control during low-load operation, and
said valve timing control means executes the exhaust valve closing timing to around the intake top dead center or to a retard side thereof during medium-load and high-load operation.

13. A variable valve timing control device according to claim 1, wherein
said variable valve timing device is provided on either of intake and exhaust sides of said internal combustion engine,
said valve timing control means controls an intake valve opening timing to around the intake top dead center or to a retard side thereof during part-load operation, and
said valve timing control means controls the intake valve opening timing to an advance side of the intake top dead center during full-load operation.

14. A variable valve timing control device according to claim 13, wherein
said valve timing control means controls an intake valve closing timing to an advance side of bottom dead center with a decrease in load during the part-load operation, and
said valve timing control means controls the intake valve closing timing to a retard side of the bottom dead center during full-load operation.

15. A variable valve timing control device for an internal combustion engine, comprising:
a variable valve timing device which changes a valve timing of an exhaust valve of said internal combustion engine; and
a valve timing control means which controls said variable valve timing device, wherein
said valve timing control means switches, in accordance with engine load, between an exhaust valve advanced-closing control which controls an exhaust valve closing timing to an advance side of an intake top dead center and an exhaust valve retarded-closing control which controls the exhaust valve closing timing to a retard side of the intake top dead center.

16. A variable valve timing control device according to claim 15, wherein said valve timing control means executes the exhaust valve retarded-closing control during high-load operation.

17. A variable valve timing control device according to claim 15, wherein said valve timing control means controls the exhaust valve closing timing to around the intake top dead center during idling operation.

18. A variable valve timing control device according to claim 15, wherein said valve timing control means switches between the exhaust valve advanced-closing control and the exhaust valve retarded-closing control in accordance with an engine speed.

19. A variable valve timing control device according to claim 18, wherein said valve timing control means executes the exhaust valve retarded-closing control during high-speed operation.

20. A variable valve timing control device according to claim 15, wherein said valve timing control means switches to the exhaust valve retarded-closing control or controls the exhaust valve closing timing to the retard side when the internal combustion engine knocks.

* * * * *